(12) United States Patent
Lu et al.

(10) Patent No.: US 11,622,253 B2
(45) Date of Patent: Apr. 4, 2023

(54) BLUETOOTH DEVICE AND WORKING METHOD THEREOF

(71) Applicant: Feitian Technologies Co., Ltd., Beijing (CN)

(72) Inventors: Zhou Lu, Beijing (CN); Huazhang Yu, Beijing (CN)

(73) Assignee: Feitian Technologies Co., Ltd., Beijing (CN)

( * ) Notice: Subject to any disclaimer, the term of this patent is extended or adjusted under 35 U.S.C. 154(b) by 0 days.

(21) Appl. No.: 17/297,013

(22) PCT Filed: Sep. 3, 2020

(86) PCT No.: PCT/CN2020/113294
§ 371 (c)(1),
(2) Date: May 26, 2021

(87) PCT Pub. No.: WO2021/073300
PCT Pub. Date: Apr. 22, 2021

(65) Prior Publication Data
US 2022/0248198 A1    Aug. 4, 2022

(30) Foreign Application Priority Data
Oct. 18, 2019  (CN) .......................... 201910994617.2

(51) Int. Cl.
| H04B 7/00 | (2006.01) |
| H04W 4/80 | (2018.01) |
| H04W 76/11 | (2018.01) |
| H04W 12/06 | (2021.01) |
| G06F 3/023 | (2006.01) |

(52) U.S. Cl.
CPC ............. *H04W 4/80* (2018.02); *H04W 12/06* (2013.01); *H04W 76/11* (2018.02); *G06F 3/023* (2013.01)

(58) Field of Classification Search
CPC ....... H04W 4/80; H04W 76/11; H04W 12/06; G06F 3/023
USPC .......................................................... 455/41.1
See application file for complete search history.

(56) References Cited

U.S. PATENT DOCUMENTS

| 9,749,953 | B2* | 8/2017 | Seo ..................... H04L 63/0492 |
| 11,568,387 | * | 1/2023 | Lu .............................. G06F 8/71 |
| 2003/0013483 | A1* | 1/2003 | Ausems ............ H04M 1/72469 |
| | | | 455/566 |
| 2007/0123166 | A1* | 5/2007 | Sheynman ............ H04W 12/50 |
| | | | 455/41.2 |

(Continued)

*Primary Examiner* — April G Gonzales
(74) *Attorney, Agent, or Firm* — Hammer & Associates, P.C.

(57) ABSTRACT

A Bluetooth device, which realizes different types of device by setting a MAC address of the device or a type of a broadcast device; when the device is used as a Bluetooth keyboard device, it can realize a function for inputting a dynamic password, and the device shifts an obtained dynamic password value into Bluetooth keyboard class virtual key information according to the Bluetooth keyboard protocol, and sends automatically the virtual key information to the upper computer successively, and the device can restore a type of the device so as to resolve a keyboard conflict between the keyboard device and the upper computer, in this way, the user makes less error to input a dynamic password and the identity authentication becomes safer.

20 Claims, 4 Drawing Sheets

(56) References Cited

U.S. PATENT DOCUMENTS

| | | | | |
|---|---|---|---|---|
| 2009/0143104 A1* | 6/2009 | Loh | ............... | G06Q 20/352 |
| | | | | 340/10.1 |
| 2009/0249478 A1* | 10/2009 | Rosener | ............... | G06F 21/31 |
| | | | | 726/19 |
| 2009/0325566 A1* | 12/2009 | Bell | ............... | H04W 8/22 |
| | | | | 455/419 |
| 2011/0195665 A1* | 8/2011 | Friedlaender | ............... | G08C 17/02 |
| | | | | 455/41.2 |
| 2013/0344812 A1* | 12/2013 | Dees | ............... | H04W 12/04 |
| | | | | 455/41.2 |
| 2015/0319557 A1* | 11/2015 | El-Hoiydi | ............... | H04W 56/001 |
| | | | | 455/41.2 |
| 2017/0093822 A1* | 3/2017 | Gutierrez | ............... | H04W 4/80 |
| 2017/0351630 A1* | 12/2017 | Li | ............... | G06F 13/4027 |
| 2019/0028269 A1* | 1/2019 | Lu | ............... | H04L 9/3268 |
| 2019/0192768 A1* | 6/2019 | Gupta | ............... | A61B 5/1468 |
| 2019/0253997 A1* | 8/2019 | Hermann | ............... | G01S 13/74 |
| 2022/0248198 A1* | 8/2022 | Lu | ............... | H04W 76/11 |

* cited by examiner

BLUETOOTH DEVICE AND WORKING METHOD THEREOF

FIELD OF THE INVENTION

The present invention relates to a Bluetooth device and a working method thereof, which belong to the field of communication technology.

PRIOR ART

With development of the internet technology, the information safety becomes more and more important, thus, identity authentication plays an important role because it is the first step of the protection. In prior art, the identity authentication technology, in addition to smart key devices, the devices used for identity authentication also include dynamic password devices, so that only legitimate users can access the application system and use services. Dynamic password authentication has become a mainstream was of identity authentication technology, which is widely used in enterprises, online games, finance and other fields. However, in prior art, the smart key device and dynamic password device are two independent devices. The integration of the devices is poor, which fails to fully utilize resources and reduces user experience. In the prior art, when the device is used as a dynamic password device to establish a connection with the upper computer, once the upper computer detects that the device is a Bluetooth keyboard device, the virtual keyboard of its own system will be hidden. Therefore, the device conflicts with the upper computer keyboard, resulting in such a problem that the user is unable to input the dynamic password generated by the device to the upper computer; in addition, in the prior art, the dynamic password device is generated by the dynamic password device, and users need to manually input the generated dynamic password into the host computer or terminal device for authentication operation. However, some problems exist in such a manually input manner, such as manually inputting error and slow speed of manually inputting, which could lead to failure of dynamic password authentication.

SUMMARY OF THE INVENTION

The object of the present invention is to provide a Bluetooth device and a working method thereof, which improves safety of the identity authentication by lowering the chance for a user to input a wrong dynamic password, so as to resolve a keyboard conflict problem between a keyboard device and an upper computer.

Thus, according to one aspect of the present invention, there is provided a working method for a Bluetooth device, which includes:

Step S1, starting, by a device, a first Bluetooth service and broadcasting that the device is a non-keyboard Bluetooth device:

Step S2, closing the first Bluetooth service when the device detectives a key is pressed, and executing Step S3;

Step S3, storing, by the device, a current MAC address as a first MAC address, obtaining a second MAC address, and setting the current MAC address as the second MAC address;

Step S4, starting, by the device, a second Bluetooth service and broadcasting that the device is a Bluetooth keyboard device, waiting for receive a building a connection instruction sent from an upper computer, trying to connect to the upper computer if the building a connection instruction is received, obtaining an applet identification of dynamic password applet and choosing an OTP applet according to the applet identification in the case that the device connects to the upper computer successfully;

Step S5, obtaining, by the device, an OTP value via the OTP applet, and sending the obtained OTP value to the upper computer according to a Bluetooth keyboard protocol; and Step S6, closing, by the device, the second Bluetooth service, obtaining the first MAC address which is stored, and setting a MAC address of the device as the first MAC address, starting the first Bluetooth service and broadcasting that the device is a non-keyboard Bluetooth device.

Preferably, the non-keyboard Bluetooth device is an authenticating device specifically; before Step S2, the method further includes that the device waiting for receiving the building a connection instruction sent from the upper computer, and trying to connect to the upper computer when the building a connection instruction is received, and choosing the authenticating applet according to the applet identification.

Preferably, that the device choosing the authenticating applet according to the authenticating applet identification specifically includes that the device obtains the applet identification from a default setting, and sends the applet identification to a secure chip in the device, the secure chip chooses the authenticating applet according to the applet identification; or the device receives a choosing applet instruction sent from the upper computer, and sends the choosing applet instruction to the secure chip in the device, the secure chip obtains the authenticating applet identification according to the choosing applet instruction, and chooses the authenticating applet according to the authenticating apple identification.

Preferably, Step S2 further includes that the device receives data sent from the upper computer, and processes the received data through the secure chip to obtain a processed result, and returns the processed result to the upper computer.

Preferably, receiving, by the device, data sent from the upper computer, and processing the received data via the security chip specifically is the device determines a type of the received data sent from the upper computer;

the method executes Step 101 if the received data is register request data; executes Step 103 if the received data is authenticate request data; executes Step 106 if the received data is other data;

Step 101, the device parses the register request data to obtain a first data and a second data, generates a second key pair; obtains the data which is being encrypted by consisting a private key of the second key pair and the first data, encrypts the data which is being encrypted by using the stored symmetric key to obtain a key handle; signs on the stored certificate template content by using a private key of the preset key pair to obtain a signature value, and obtains an authentication certificate by consisting the signature value and the certificate template content; consists a first being signed data according to the first data, the second data, the key handle and the public key of the second key pair, and signs on the first being signed data by using the private key of the stored first key pair to obtain a first signature result;

Step 102, the device consists response data of the register request data according to the second key pair, the key handle, the authenticate certificate and the first signature result, and returns the response data to the upper computer;

Step 103, the device parses the authentication request data to obtain a first parameter, a second parameter and the key handle, and decrypts the key handle by using the stored symmetric key to obtain a first decrypted data and a second decrypted data;

Step 104, the device obtains a current number of authentication times, consists a second being signed data according to the first parameter, the second parameter and the number of authentication times, and signs on the second being signed data by using the second decrypted data to obtain the second signature result;

Step 105, the device consists response data of the authentication request data according to the number of authentication times and the second signature result, and returns the response data of the authentication request data to the upper computer; and Step 106, the device executes other corresponding operations, and returns the corresponding response data to the upper computer.

Preferably, before Step 104, the method further includes that determining whether the current user is legitimate according to the first parameter and the first decrypted data, if yes, executing Step 104; otherwise, consisting the response data of the authentication request data according to the preset error byte code, and returning the response data of the authentication request data to the upper computer.

Preferably, before the device processes the received data via the security chip, the method further includes that the device determines whether the received data is authentication data or register data, if yes, returns the processed result to the upper computer, and closes down; otherwise, returns to Step S2.

Preferably, sending, by the device, the obtained dynamic password value to the upper computer according to the Bluetooth keyboard protocol specifically is that the device changes the obtained dynamic password value into Bluetooth-keyboard-class virtual keyboard information according to the Bluetooth keyboard protocol, and automatically sends the virtual keyboard information to the upper computer successively.

Preferably, obtaining, by the device, the applet identification of the dynamic password applet and choosing the dynamic password applet according to the applet identification specifically is that the device receives the choosing applet instruction from the upper computer, and sends the choosing applet instruction to the security chip in the device, the security chip obtains the applet identification according to the choosing applet instruction, and chooses the dynamic password applet according to the applet identification.

Preferably, checking, by the device, whether there is a key which is pressed specifically is that the device determines whether there is a key which is pressed via checking whether there is a triggering key signal in the chip IO port.

Preferably, obtaining, by the device, the second MAC address specifically is that the device obtains the current MAC address, and adds 1 to the last byte of the current MAC address to obtain the second MAC address.

According to the other aspect of the present invention, there is provided a Bluetooth device which includes a starting module, a declaring module, a checking module, a turning off module, a setting module, a waiting and receiving module, a connecting module, an obtaining module, a selecting applet module, and a sending module; in which the starting module is configured to start a first Bluetooth service and broadcast;

the starting module is further configured to start a second Bluetooth service and broadcast;

the declaring module is configured to declare the Bluetooth device is a Bluetooth non-keyboard device;

the declaring module is further configured to declare the Bluetooth device is a Bluetooth keyboard device;

the checking module is configured to check whether a key is pressed;

the turning off module is configured to turn off the first Bluetooth service when the checking module checks the key is pressed;

the turning off module is configured to turn off the second Bluetooth service;

the obtaining module is configured to obtain the second MAC address;

the setting module is configured to store the current MAC address as the first MAC address, and to set the current MAC address as the second MAC address;

the obtaining module is further configured to obtain the first MAC address which is stored;

the setting module is further configured to set the MAC address of the device as the first MAC address, and start the first Bluetooth service and broadcast that the device is a Bluetooth non-keyboard device.

the waiting and receiving module is configured to wait for receiving the building connection instruction sent from the upper computer;

the connecting module is configured to build a connection when the waiting and receiving module receives the building connection instruction;

the selecting applet module is configured to obtain the applet identification of the dynamic password applet when the connecting module builds connection successfully, and select the dynamic password applet according to the applet identification;

the obtaining module is further configured to obtain the dynamic password value via the dynamic password applet; and the sending module is configured to send the dynamic password value obtained by the obtaining module to the upper computer according to the Bluetooth keyboard protocol.

Preferably, the Bluetooth non-keyboard device specifically is an authentication device;

after the declaring module declares the Bluetooth device is the Bluetooth non-keyboard device, the device further includes:

the waiting and receiving module is specifically configured to wait for receiving the building connection instruction sent from the upper computer;

the connecting module is specifically configured to build connection when the waiting and receiving module receives the building connection instruction; and the selecting applet module is further configured to select the authentication applet according to the applet identification.

Preferably, the selecting applet module specifically includes a first obtaining unit, a first selecting unit, a second obtaining unit, a second selecting unit; in which the first obtaining unit is configured to obtain the applet identification from the default setting, and send the applet identification to the security chip in the device;

the first selecting unit is configured to select the authentication applet according to the applet identification obtained by the first obtaining unit;

the second obtaining unit is configured to receive the selecting applet instruction sent from the upper computer, and send the selecting applet instruction to the security chip, which obtains the authentication applet identification according to the selecting applet instruction, in the device; and the second selecting unit which is configured to select the authentication applet according to the authentication applet identification obtained by the second obtaining unit.

Preferably, the waiting and receiving module is further configured to receive data sent from the upper computer, and process the received data via the security chip to obtain a processed result, and return the processed result to the upper computer.

Preferably, the waiting and receiving module includes a first determining unit;

the first determining unit is configured to determine the type of the data sent from the upper computer;

when the first determining unit determines that the received data. is the register request data, the waiting and receiving module further includes a first parsing unit, an encrypting unit, a first signing unit and a first consisting unit; in which the first parsing unit is configured to parse the register request data to obtain the first data and the second data, and to generate the second key pair;

the first consisting unit is configured to consist the data which is being encrypted according to the private key of the second key pair and the first data;

the encrypting unit is configured to use the stored symmetric key to encrypt the being encrypted data which is consisted by the first consisting unit to obtain a key handle;

the first signing unit is configured to use the private key of a preset key pair to sign on the stored certificate template content to obtain the signature value;

the first consisting unit is further configured to consist an authenticating certificate according to the signature value and the certificate template content;

the first consisting unit is further configured to consist a first being signed data according to the first data, the second data, the key handle and the public key of the second key;

the first signing unit is further configured to use the private key of the first key pair which is stored to sign on the first being signed data to obtain a first signature result;

the first consisting unit is further configured to consist response data of the register request data according to the second key pair, the key handle, the authenticating certificate and the first signature result, and return the response data to the upper computer; and when the first determining unit determines that the received data is authenticating request data, the waiting and receiving module further includes a second parsing unit, a decrypting unit, a second signing unit and a second consisting unit;

the second parsing unit is configured to parse the authenticating request data to obtain a first parameter, a second parameter and a key handle;

the decrypting unit is configured to use the symmetric key which is stored to decrypt key handle to obtain first decrypted data and second decrypted data;

the second consisting unit is configured to obtain a number of times for current authentication, and to consist a second being signed data according to the first parameter, the second parameter and the number of times for current authentication;

the second signing unit is configured to use the second decrypted data to sign on the second being signed data to obtain a second signature result;

the second consisting unit is further configured to consist the response data of the authenticating request data according to the number of times for authentication and the second signature result, and return the response data of the authenticating request data; and when the first determining unit determines that the received data is other data, the waiting and receiving module further includes an executing unit;

the executing unit is configured to execute other corresponding operation, and return other response data to the upper computer.

Preferably, when the first determining unit determines the received data is the authenticating request data, the waiting and receiving module further includes a determining sub-unit;

the determining sub-unit is configured to determine whether the current user is legitimate according to the first parameter and the first decrypted data;

the second consisting unit is further configured to consist the response data of the authenticating request data according to a preset error byte code and return the response data to the upper computer when the determining sub-unit determines that the current user is illegitimate.

Preferably, the waiting and receiving module is specifically configured to receive data sent from the upper computer, and before the security processes the received data, the waiting and receiving module further includes a second determining unit;

the second determining unit is configured to determine whether the received data is authenticating data or the registering data;

when the second determining unit determines that the received data is the authenticating data or the registering data, the waiting and receiving module further include a turning off unit;

the turning off unit is configured to turn off the device after the processed result is returned to the upper computer.

Preferably, the second module includes a switching unit and a sending unit;

the switching unit is configured to switch the dynamic password value obtained by the obtaining module into Bluetooth keyboard class virtual key information according to the Bluetooth keyboard protocol; and the sending unit is configured to send the virtual key information obtained by the switching unit to the upper computer successively.

Preferably, the selecting applet module includes a third obtaining unit and a third selecting unit, the third obtaining unit is configured to receive the selecting applet instruction sent from the upper computer, and to send the selecting applet instruction to the security chip in the device, and the security chip obtains the applet identification according to the selecting applet instruction; and the third selecting unit is configured to select the dynamic password applet according to the applet identification obtained by the third obtaining unit.

Preferably, the checking module is specifically configured to determine whether there is a key is pressed via checking whether there is a triggering key signal in a checking chip IO port.

Preferably, when the obtaining module is configured to obtain the second MAC address, the obtaining module is specifically configured to obtain the current MAC address, and add 1 to the last byte of the current MAC address to obtain the second MAC address.

According to the present invention, the Bluetooth device realizes different types of device by setting a MAC address of the device or a type of a broadcast; when the device is used as a Bluetooth keyboard device, it can realize a function for inputting a dynamic password, and the device shifts an obtained dynamic password value into Bluetooth keyboard class virtual key information according to the Bluetooth keyboard protocol, and sends automatically the virtual key information to the upper computer successively, and the device can restore its type of the device so as to resolve a keyboard conflict between the keyboard device and the upper computer, in this way, the user makes less error to input a dynamic password and the identity authentication becomes safer.

BEST MODE FOR CARRYING OUT EMBODIMENTS

The technical solution in the Embodiments of the present invention is further described more clearly and completely with the drawings of the present invention. Apparently, Embodiments described herein are just a few Embodiments of the present invention. On the basis of Embodiments of the invention, all other related Embodiments made by those skilled in the art without any inventive work belong to the scope of the invention.

Embodiment 1:

The Bluetooth device mentioned in Embodiment 1 can realize at least two types of applet functions, each type of the applet has a matched Bluetooth service; multiple types of applets can use one Bluetooth service, or one applet corresponds one Bluetooth service. The applet in Embodiment 1 includes a first applet and a dynamic password applet, the Bluetooth service corresponding to the first applet is a first Bluetooth service, the Bluetooth service corresponding to the dynamic password applet is a second Bluetooth service.

Figure 1:
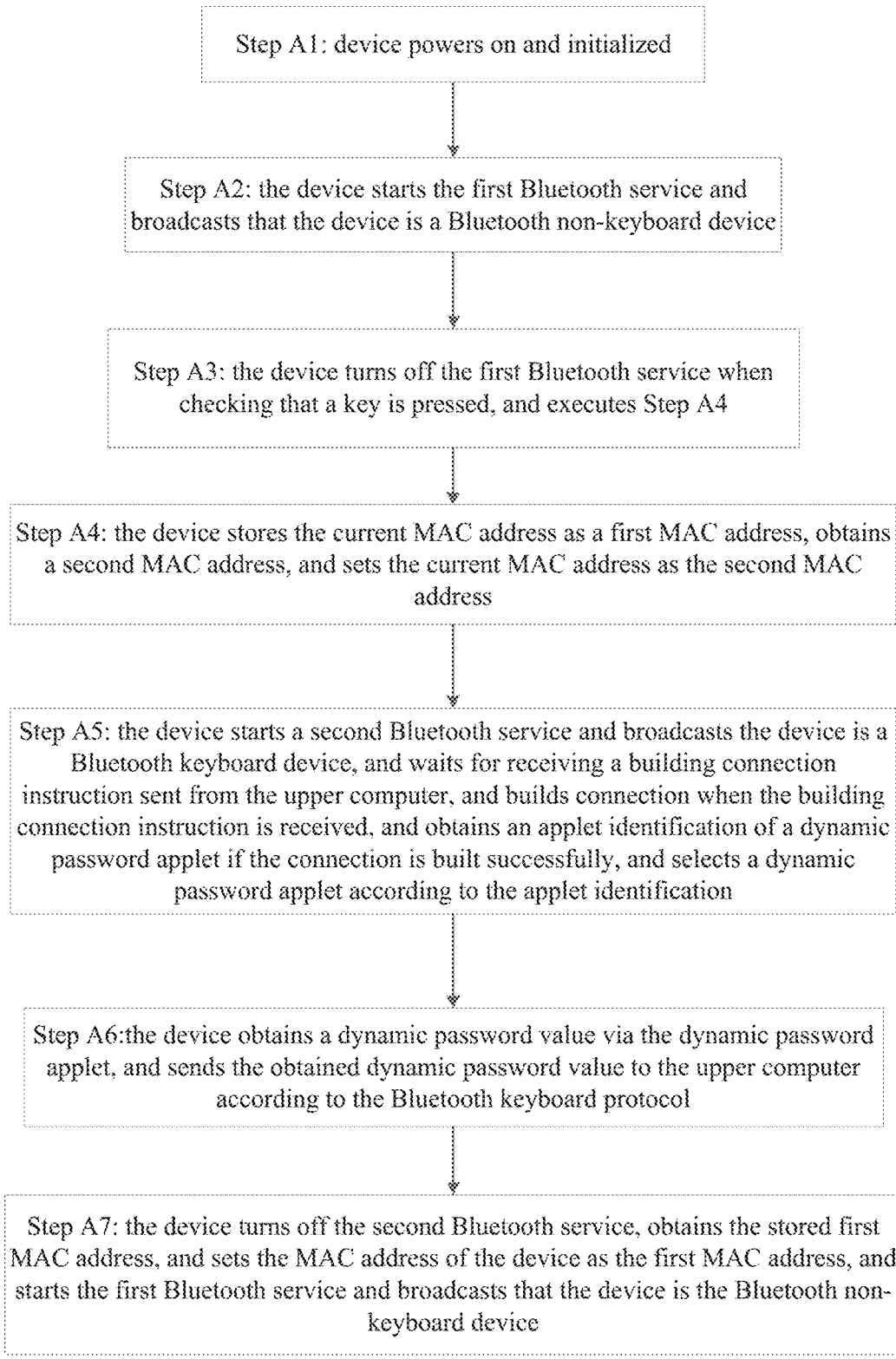
FIG. 1 is a flow chart of a working method for a Bluetooth device according to Embodiment 1 of the present invention.

It provides a working method for a Bluetooth device according to Embodiment 1 of the present invention. As shown in FIG. 1, the method includes the following steps.

Step A1, a device powers on and initialized;

In Embodiment 1, a peripheral of the device and a clock of the device can be initialized after the device powers on.

Step A2, the device starts the first Bluetooth service and broadcasts that the device is a Bluetooth non-keyboard device.

Step A3, the device turns off the first Bluetooth service when checking that a key is pressed, and executes Step A4;

In Embodiment 1, the device determines whether a key is pressed via determining whether there is a triggering-press-key signal in the checking chip IO port.

Step A4, the device stores the current MAC address as a first MAC address, obtains a second MAC address, and sets the current MAC address as the second MAC address.

Specifically, the device reads a MAC address stored in a register and makes the MAC address as the first MAC address.

Preferably, the device obtaining the second MAC address specifically is the device amends the first MAC address as the second MAC address.

Preferably, the device amending the first MAC address as the second MAC address specifically is that the device adds 1 to a last byte of the current MAC address to obtain a MAC address, and makes the MAC address which is obtained as the second MAC address.

For instance, the first MAC address is ef:07:52:6a:5f:2c: the second MAC address is ef:07:52:6a:5f:2d.

Step A5, the device starts a second Bluetooth service and broadcasts that the device is a Bluetooth keyboard device, and waits for receiving a building connection instruction sent from the upper computer, and builds connection when the building connection instruction is received, and obtains an applet identification of a dynamic password applet if the connection is built successfully, and selects a dynamic password applet according to the applet identification.

In Embodiment 1, the device reads the applet identification of the dynamic password which is stored via the register, for instance the applet identification of the dynamic password is 2.

Preferably, the device selecting the dynamic password applet according to the applet identification specifically is the device sends a selecting applet instruction to the security chip of the device, the security chip selects a corresponding applet according to the applet identification in the instruction.

Step A6, the device obtains a dynamic password value via the dynamic password applet, and sends the obtained dynamic password value to the upper computer according to the Bluetooth keyboard protocol.

In Embodiment 1, sending the obtaining dynamic password value to the upper computer according to the Bluetooth keyboard protocol specifically is that the device switches the obtained dynamic password value into Bluetooth keyboard class virtual key information according to the Bluetooth keyboard protocol, and sends automatically the virtual key information to the upper computer successively.

Step A7, the device turns off the second Bluetooth service, obtains the stored first MAC address, and sets the MAC address of the device as the first MAC address, and starts the first Bluetooth service and broadcasts that the device is the Bluetooth non-keyboard device.

In Embodiment 1, the device specifically reads the first MAC address stored in the register.

For instance, the stored first MAC address is ef:07:52:6a: 5f:2c; and the current MAC address is ef:07:52:6a:5f:2d.

In Embodiment 1, after the device declares that the device is the Bluetooth non-keyboard device, the method further includes that the device waits for receiving the building connection instruction sent from the upper computer, and builds connection when the building connection instruction is received, and selects applet according to the applet identification if the connection is built successfully; and turns off the device is the connection is built overtime.

Preferably, the ways for selecting applet according to the applet identification include that the device selects an applet according to a default setting, or selects an applet according to the received selecting applet instruction sent from a terminal.

Specifically, the default setting includes the applet identification.

In Embodiment 1, the device selecting applet specifically is the device sends the selecting applet instruction to the security chip in the device, and the security chip selects a corresponding applet according to the applet identification in the instruction.

In Embodiment 1, after the device, as the Bluetooth non-keyboard device, connects with the upper computer successively, and selects the applet, the method further includes that the device receives data sent from the upper computer, process the received data via the security chip to obtain a processed result, and returns the processed result to the upper computer.

Specifically, receiving, by the device, the data sent from the upper computer and processing the received data via the security chip specifically is that the device determines a type of the data sent from the upper computer;

when the received data is register request data, Step a1 is executed; when the received data is authenticating request data, Step a3 is executed; when the received data is other data, Step a6 is executed;

Step a1, the device parses the register request data to obtain a first data and a second data, generates a second key pair; and consists being-encrypted data according to a private key of the second key pair and the first data, encrypts the being-encrypted data by using a stored symmetric key pair to obtain a key handle; signs on a stored certificate template content by using a private key of a preset key pair to obtain a signature value, consists an authenticating certificate according to the signature value and the certificate template content; consists a first being-encrypted data according to the first data, the second data, the key handle and a public key of the second key pair, and signs on the first being-signed data by using the private key of the first key pair to obtain a first signature result;

Step a2, the device consists response data of the register request data according to the second key pair, the key handle, the authenticating certificate and the first signature result, and returns the response data to the upper computer;

Step a3, the device parses the authenticating request data to obtain a first parameter, a second parameter and the key handle, decrypts the key handle by using the stored symmetric key to obtain a first decrypted data and a second decrypted data;

Step a4, the device obtains a current number of times for authenticating, consists a second being-signed data according to the first parameter, the second parameter and the number of times for authenticating, signs on the second being-signed data by using the second decrypted data to obtain a second signature result;

Step a5, the device consists response data of the authenticating request data according to the number of times for authenticating and the second signature result, and returns the response data to the upper computer; and Step a6, the device executes other corresponding operations, and returns corresponding response data to the upper computer.

Preferably, before Step a4, the method further includes that the device determines whether a current user is legitimate according to the first parameter and the first decrypted data, if yes, executes Step a4; otherwise, consists response data of the authenticating request data according to a preset error byte code, and returns the response data to the upper computer.

Preferably, before the device processing the received data via the security chip, the method further includes that the device determines whether the received data is authenticating data or register data, returns a processed result to the upper computer if the received data is the authenticating data or the register data, and then turns off the device.

Embodiment 2:

The Bluetooth device mentioned in Embodiment 2 can realize at least two types of applet functions, each function has a matched Bluetooth service or one applet corresponds one Bluetooth service. In Embodiment 2, the applets include an authenticating applet and a dynamic password applet, the authenticating applet corresponds to the first Bluetooth service, and the dynamic password applet corresponds to the second Bluetooth service.

Figure 2:
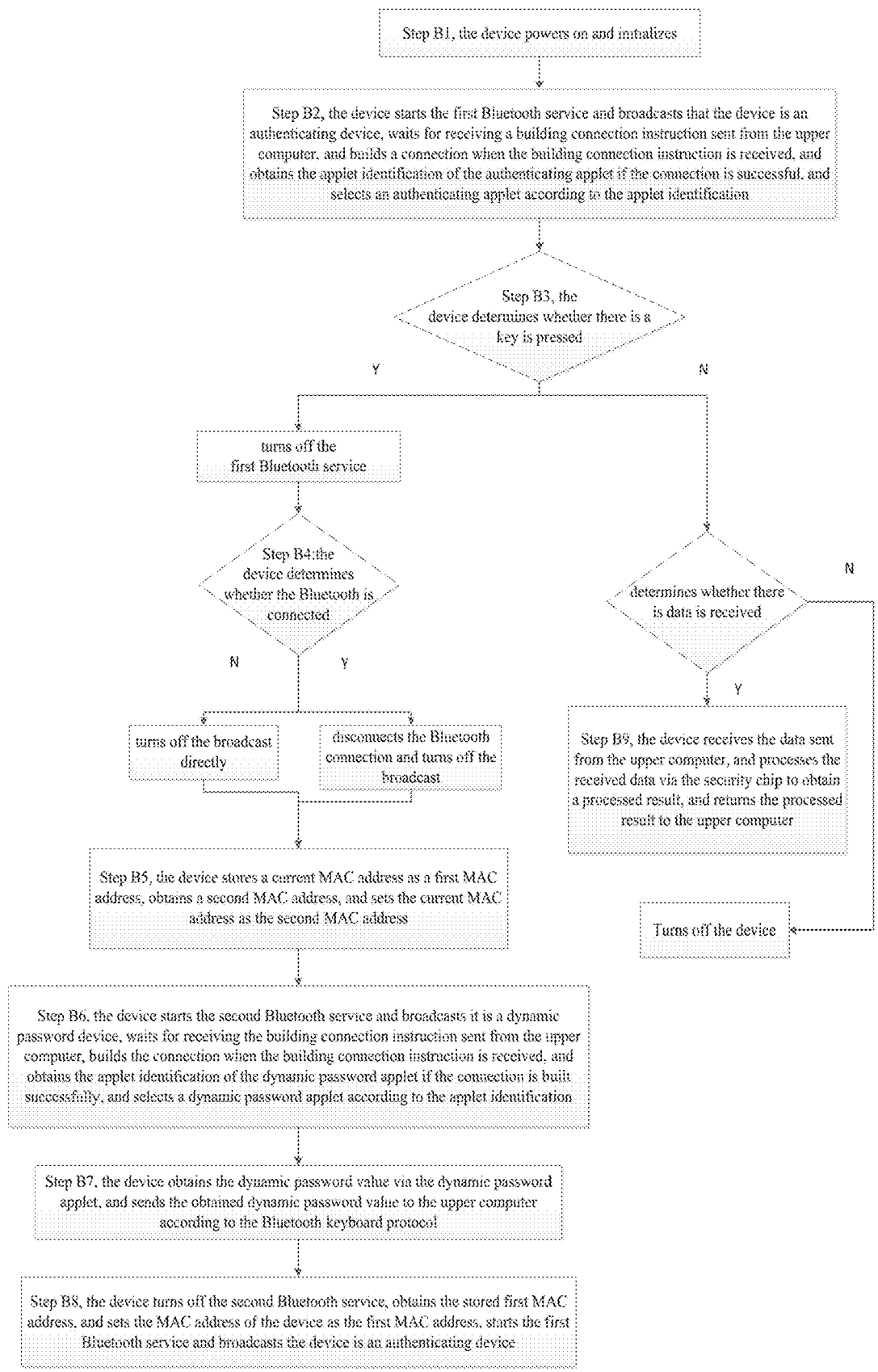
FIG. 2 is a flow chart of a working method for a Bluetooth device according to Embodiment 2 of the present invention.

According to Embodiment 2 of the present invention, it provides a working method for a Bluetooth device. As shown in FIG. 2, the method includes the following steps.

Step B1, the device powers on and initializes.

In Embodiment 2, after the device powering on, a peripheral of the device and a clock can be initialized.

Step B2, the device starts the first Bluetooth service and broadcasts that the device is an authenticating device, waits for receiving a building connection instruction sent from the upper computer, and builds a connection when the building connection instruction is received, and obtains the applet identification of the authenticating applet if the connection is successful, and selects an authenticating applet according to the applet identification.

In Embodiment 2, the ways for selecting the authentication applet include that the device selects an applet according to a default setting, or the device selects an applet according to the received selecting applet instruction sent from the terminal.

Specifically, the default setting includes the applet identification.

In Embodiment 2, selecting, by the device, the authenticating applet specifically is that the device sends the selecting applet instruction to the security chip in the device, and the security chip selects a corresponding applet according to the applet identification in the instruction.

For instance, the device broadcasting the device is an authenticating device specifically is /**<Human Interface Device service UUID. */, UUID: 0x1812;

the building connection instruction is 0x1b 0x06 0x35 0x01 0x34 0x11 0x06 0x0a 0x01 0x26 0x2f 0x00 0x00 0x97 0x00 0x00 0x00 0xd6 0xbe 0x89 0x8e 0x85 0x22 0xa1 0x06 0x15 0xd0 0x9e 0x78 0xad 0x99 0xa4 0xbc 0x55 0xc0 0xe0 0x5c 0x65 0x50 0x28 0xb0 0xf0 0x03 0x19 0x00 0x27 0x00 0x00 0x00 0xbc 0x02 0xff 0xff 0xff 0xff 0x1f 0xa8 0xf2 0x61 0xda.

For instance, the authenticating applet specifically is FIDO, the applet identification of the authenticating applet is 0.

Step B3, the device determines whether there is a key is pressed, if yes, turns off the first Bluetooth service, and executes Step B4; otherwise, determines whether data is received, if yes, executes Step B9; otherwise, turns off the device.

In Embodiment 2, the device determines whether a key is pressed by determining whether there is a triggering key signal in a checking chip IO port.

Step B4, the device determines whether the Bluetooth is connected, if yes, disconnects the Bluetooth connection and turns off the broadcast; otherwise, turns off the broadcast directly, and executes Step B5.

Step B5, the device stores a current MAC address as a first MAC address, obtains a second MAC address, and sets the current MAC address as the second MAC address.

Specifically, the device reads a MAC address stored in a register and makes the MAC address as the first MAC address.

Preferably, obtaining, by the device, the second MAC address specifically is that the device amends the first MAC address as the second MAC address;

Preferably, amending, by the device, the first MAC address as the second MAC address specifically is that the device adds 1 to the last byte of the current MAC address which is read to obtain a MAC address, and makes the MAC address as the second MAC address.

For instance, the MAC address of the current authenticating applet is 0xa1 0x06 0x15 0xd0 0x9e 0x78; and the second MAC address is 0xa1 0x06 0x15 0xd0 0x9e 0x79.

Step B6, the device starts the second Bluetooth service and broadcasts that it is a dynamic password device, waits for receiving the building connection instruction sent from the upper computer, builds the connection when the building connection instruction is received, and obtains the applet identification of the dynamic password applet if the connection is built successfully, and selects a dynamic password applet according to the applet identification.

In Embodiment 2, the device specifically reads the applet identification of the stored dynamic password applet via the register, for instance, the applet identification of the dynamic password is 2.

Preferably, the device selecting the dynamic password applet according to the applet identification specifically is that the device sends the selecting applet instruction to the security chip in the device, and the security chip selects a corresponding applet according to the applet identification in the instruction.

Specifically, the device broadcasting that it is a dynamic password device specifically is /**<Human Interface Device service UUID. */, UUID: 0xFFTD; and the building connection instruction is 0x1b 0x06 0x35 0x01 0x34 0x11 0x06 0x0a 0x01 0x26 0x2f 0x00 0x00 0x97 0x00 0x00 0x00 0xd6 0xbe 0x89 0x8e 0x85 0x22 0xa1 0x06 0x15 0xd0 0x9e 0x78 0xad 0x99 0xa4 0xbc 0x55 0xc0 0xe0 0x5c 0x65 0x50 0x28 0xb0 0xf0 0x03 0x19 0x00 0x27 0x00 0x00 0x00 0xbc 0x02 0xff 0xff 0xff 0xff 0x1f 0xa8 0xf2 0x61 0xda.

Step B7, the device obtains the dynamic password value via the dynamic password applet, and sends the obtained dynamic password value to the upper computer according to the Bluetooth keyboard protocol.

In Embodiment 2, sending the obtained dynamic password value to the upper computer according to the Bluetooth keyboard protocol specifically is that the device switches the obtained dynamic password into the Bluetooth keyboard class virtual key information according to the Bluetooth keyboard protocol, and automatically sends the virtual key information to the upper computer successively.

Specifically, the dynamic password value obtained by the device is 12345; and the virtual key information sent from the device specifically is 0d 03 38 e2 01 60 0a 15 aa 5a 7b 65 50 16 13 0b 00 04 00 1b 16 00 00 00 1e 00 00 00 00 00 89 64 3f d4 64 ec d6 when the key 1 is pressed; the information sent from the device is 0d 03 38 e2 01 60 0a 15 aa 5a 7b 65 50 1a 13 0b 00 04 00 1b 16 00 00 00 00 00 00 00 00 9b 4e 39 6f 1c 34 14 in the case that the key 1 is stopped being pressed; the information sent from the device is 0d 03 38 e2 01 60 0a 15 aa 5a 7b 65 50 16 13 0b 00 04 00 1b 16 00 00 00 1f 00 00 00 00 00 a2 7e 84 60 d8 76 ba when the key 2 is pressed; the information sent from the device is 0d 03 38 e2 01 60 0a 15 aa 5a 7b 65 50 1a 13 0b 00 04 00 1b 16 00 00 00 00 00 00 00 00 bf 76 17 a2 ee 88 f4 in the case that the key 2 is stopped being pressed; the information seat from the device is 0d 03 38 e2 01 60 0a 15 aa 5a 7b 65 50 16 13 0b 00 04 00 1b 16 00 00 00 20 00 00 00 00 00 18 4b 9f a8 fa 17 0a when the key 3 is pressed; the information is 0d 03 1e e3 01 60 08 15 aa 5a 7b 65 50 1a 13 0b 00 04 00 1b 16 00 00 00 00 00 00 00 00 7d 23 8b 74 bd 8a ab when the key 3 is stopped being pressed; the information sent from the device is 0d 03 1e e3 01 60 08 15 aa 5a 7b 65 50 16 13 0b 00 04 00 1b 16 00 00 00 21 00 00 00 00 00 56 99 15 c0 20 61 01 when the key 4 is pressed; the information sent from the device when the key 4 is stopped being pressed; the information sent from the device is 0d 03 1e e3 01 60 08 15 aa 5a 7b 65 50 16 13 0b 00 04 00 1b 16 00 00 00 22 00 00 00 00 00 92 7d 22 7b 7c 88 2c when the key 5 is pressed; the information sent from the device is 0d 03 1e e3 01 60 08 15 aa 5a 7b 65 50 1a 13 0b 00 04 00 1b 16 00 00 00 00 00 00 00 00 3f 73 d2 f0 50 cf a6 when the key 5 is stopped being pressed.

Step B8, the device turns off the second Bluetooth service, obtains the stored first MAC address, and sets the MAC address of the device as the first MAC address, starts the first Bluetooth service and broadcasts the device is an authenticating device. In Embodiment 2, the device specifically reads the stored first MAC address via the register.

For instance, the stored first MAC address is 0xa1 0x06 0x15 0xd0 0x9e 0x78; and the current MAC address is 0xa1 0x06 0x15 0xd0 0x9e 0x79.

Step B9, the device receives the data sent from the upper computer, and processes the received data via the security chip to obtain a processed result, and returns the processed result to the upper computer.

Figure 3:
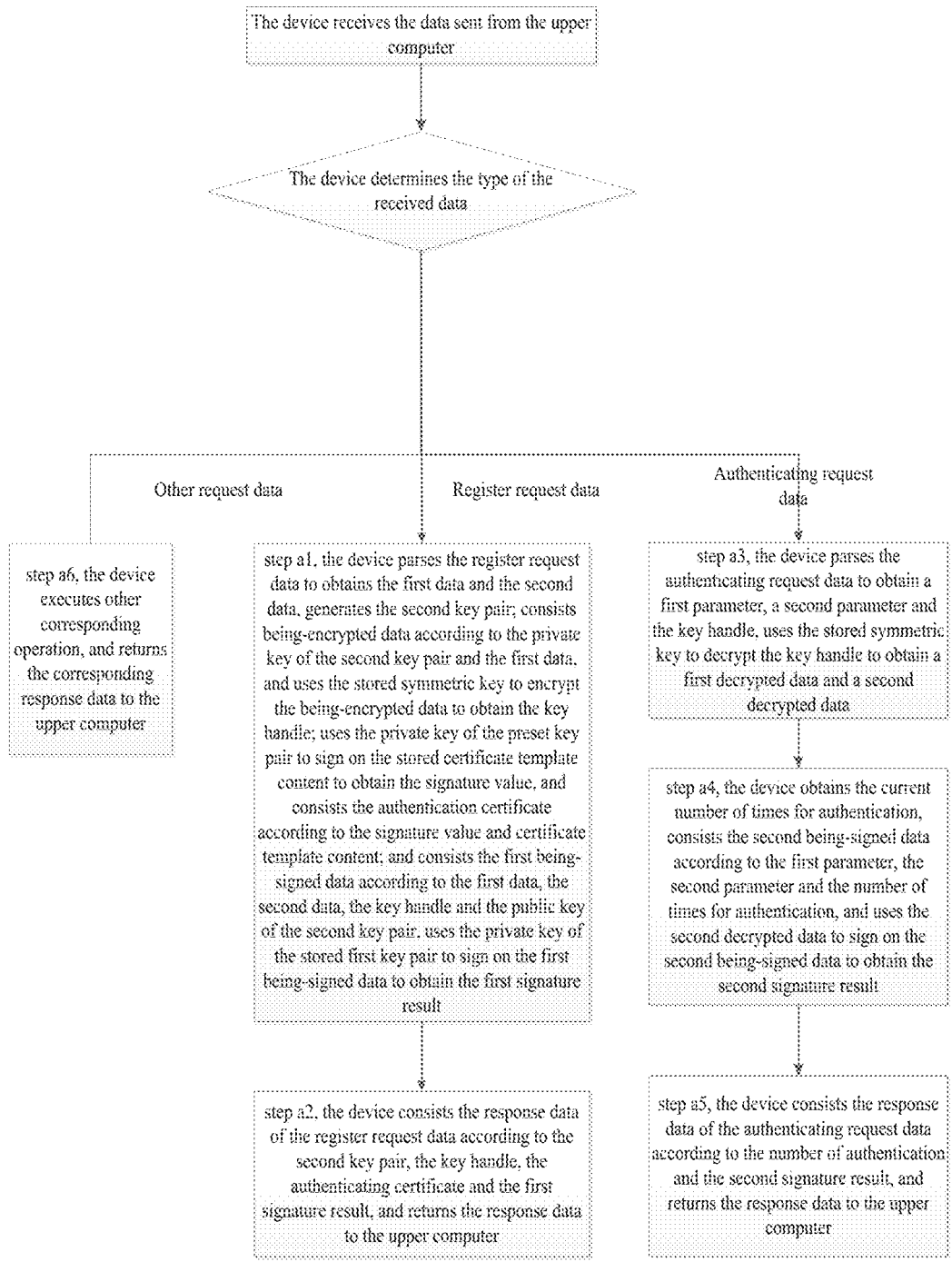
FIG. 3 is a flow chart of a method for processing received data by a Bluetooth device according to Embodiment 2 of the present invention.

Specifically, receiving, by the device, the data sent from the upper computer, and processing the received data via the security chip specifically is that, as shown in FIG. 3, the device determines a type of the received data sent from the upper computer;

the method executes step a1 when the received data is register request data; executes step a3 when the received data is authenticating request data; and executes step a6 when the received data is other data;

step a1, the device parses the register request data to obtain the first data and the second data, generates the second key pair; consists being-encrypted data according to the private key of the second key pair and the first data, and uses the stored symmetric key to encrypt the being-encrypted data to obtain the key handle; uses the private key of the preset key pair to sign on the stored certificate template content to obtain the signature value, and consists the authentication certificate according to the signature value and certificate template content; and consists the first being-signed data according to the first data, the second data, the key handle and the public key of the second key pair, uses the private key of the stored first key pair to sign on the first being-signed data to obtain the first signature result;

specifically, the register request data is consisted from data of 64 bytes, the step specifically is parsing the register request data to obtain the data of the first 32 bytes as the first data, and obtain the data of last 32 bytes as the second data;

for instance, the register data is
01a4015820687134968222ec17202e42505f8ed2b16ae22f1
6bb05b88c25db9e602645f14102a26269
646773657276657231646e616d65677365727665723103a
362696458202b6689bb18f4169f069fbcd
f50cb6ea3c60a861b9a7b63946983e0b577b78c70646e616d
65717465737463746174617040637461702e
636f6d6b646973706c61794e616d65695465737420437461
700483a263616c672664747970656a6707

5626c69632d6b6579a263616c6739010064747970656a707
5626c69632d6b6579a263616c67382464
747970656a7075626c69632d6b6579;
the authenticating data is
02a4016773657276657231025820687134968222ec17202e
42505f8ed2b16ae22f16bb05b88c25db9
e602645f1410385a26269645832010101010101010101010
10101010101010101010101010101010
1010101010101010101010101010101010101010101010101
64747970656a7075626c69632d6b6579a
26269645832020202020202020202020202020202020202
020202020202020202020202020202020
2020202020202020202020202020202020264747970656a7075
626c69632d6b6579a26269645870286ca
7f4cc4480c6fdf7e15d076db62054c8f96df7bd604224ca049
61d92d2db15cbee20d02d1191b182d53d
51534df4042650797dbd9386c853405827c2ab469f563380
c4293fa1e80c6cf424afcbbc65e757879eb
fec78f59777e5ba6541f3cb6212fb74aab630f17a512ecdcac6
6564747970656a7075626c69632d6b65
79a26269645832040404040404040404040404040404040
404040404040404040404040404040404
040404040404040404040404040404040464747970656a70
75626c69632d6b6579a2626964583205
0505050505050505050505050505050505050505050505050
5050505050505050505050505050505
05050505050505050564747970656a7075626c69632d6b65
7905a1627570f5.
step a2, the device consists the response data of the
register request data according to the second key pair, the
key handle, the authenticating certificate and the first sig-
nature result, and returns the response data to the upper
computer;
specifically, the response data of the register request data
is
00a301667061636b65640258f47f409b1b3211c37499c9619
f42ae0d2abdee652ebdc1af0502d6b539a
67043064100000001b82ed73c8fb4e5a2402289c706066001
0070286ca7f4cc4480c6fdf7e15d076db
62054c8f96df7bd604224ca04961d92d2db15cbee20d02d11
91b182d53d51534df4042650797dbd938
6c853405827c2ab469f563380c4293fa1e80c6cf424afcbbc6
5e757879ebfec78f59777e5ba6541f3cb6
212fb74aab630f17a512ecdcac665a5010203262001215820
86010b1aee7166408a681ceb39c0b7ee9
040ea678f5ac096ee0dac3dd5d5a55b225820c93d6dc90e15
84a8d2eba08955f9544f873f6637f1603e
33d5fb47c7dee67e2703a363616c672663736967584630440
2201cf814728a06587b589cf6c672fc16
1651065f361b0ed67647fe0feb7172158f02201105824cf62
ffe4bf40f5f2ac054420e6bad5bf5f6da579
e560ae5e2e2dbf72c6378356382590162308201 5e3082010
4a003020102020900d79549bd1a671744
300a06082a8648ce3d040302301731153013060355040 30c
0c46542046494 44f20302303030201 70
d313730323230303030303305a180f323035 303035 303313
0303030 305a30183116301406035 50
4030c0d465420464944 4f3220546573 74305930130607 2a8
648ce3d020106082a8648ce3d03010703
420004df1bd845b086b939677eb01e75d646132be7c356b8
a018cc10bcfeebb074401f9d58859f9ee7
6babf9e5e1c815e1a2e4dcba0ea8f54f144e1d327cb95c2b4a
a3363034301d0603551d0e041604142
393d61a27e84fef9bbd76db099e1c728cf0ba633013060b2b
0601040182e51c02010104040302 05203
00a06082a8648ce3d04030203 480030 450221 009453c09a3
5ebe8a1db27ce01253615adc9a0feeb56a
b6ab6ea5934a1cf17362102202d109c4c295eb448315a30db
edd0301836e2755adad49e274541957b9
18b85155901823082017e30820125a003020102020101300
a06082a8648ce3d040302301731153013
06035504030c0c46542046494 44f203032303030201 70d31
36303530313030303030305a180f2303
53030353031303030303030305a3017311530130603550403
0c0c4654204649444f20303230305930
1306072a8648ce3d020106082a8648ce3d03010703420004
d066ad1a953b1ced4c954dd7dbed76a70
beed2907a89769e7336ff2620be4b199ebe7448a6d5808124
cc74153aef342d5104de556178ed478e08
310254faa385a360305e301d0603551d0e04160414491564
2dd5bbc6de333a5e0995fc872336d3bf0b
301f0603551d23041830168014491 5642dd5bbc6de333a5e
0995fc872336d3bf0b300c0603551d130
40530030101ff300e0603551d0f0101ff040403020106300a0
6082a8648ce3d0403020347003044022
0307cfaa021621407e40105a546b1d1f2d2ce51331964ce94
97ff34b24d9994a50220076c09ea765133
ca17fe7038dd187a489a2f3365f00821ffffe2e2ac101b0743;
step a3, the device parses the authenticating request data
to obtain a first parameter, a second parameter and the key
handle, uses the stored symmetric key to decrypt the key
handle to obtain a first decrypted data and a second
decrypted data;
for instance, the authenticating request data includes the
first parameter (32 bytes), the second parameter (32 bytes),
a value of key handle length (1 byte) and the key handle;
step a3 specifically is parsing the authenticating data to
obtain the data of the first 32 bytes as the first parameter, to
obtain the data of bytes from the $33^{rd}$ byte to $64^{th}$ byte as the
second parameter, and determining the key handle length
according to the value of the $65^{th}$ byte, and obtaining data of
corresponding length which is after the $65^{th}$ byte as the key
handle;
step a4, the device obtains the current number of times for
authentication, consists the second being-signed data
according to the first parameter, the second parameter and
the number of times for authentication, and uses the second
decrypted data to sign on the second being-signed data to
obtain the second signature result;
step a5, the device consists the response data of the
authenticating request data according to the number of
authentication and the second signature result, and returns
the response data to the upper computer;
specifically, the response data of the authenticating
request data is
00a301a26269645870286ca7f4cc4480c6fdf7e15d076db62
054c8f96df7bd604224ca04961d92d2db1
5cbee20d02d1191b182d53d51534df4042650797dbd9386c
853405827c2ab469f563380c4293fa1e80
c6cf424afcbbc65e757879ebfec78f59777e5ba6541f3cb621
2fb74aab630f17a512ecdcac6656474797
0656a7075626c69632d6b65790258257f409b1b3211c3749
9c9619f42ae0d2abdee652ebdc1af0502d
6b539a6704306010000000203584730450221 00e0d2dd99f
cd91d1e70e07c799da317be98fc7a65eaf
767394e76ec749f8e31d002203084474d7d2959f3e2e25433
8a625a5bc8c558b02e10f9c590799428e d8a8bd0; and
step a6, the device executes other corresponding opera-
tion, and returns the corresponding response data to the
upper computer.
Preferably, before step a4, the method further includes
determining whether the current user is legitimate according
to the first parameter and the first decrypted data, if yes,
executing step a2; otherwise, consisting the response data of the authenticating request data according to the preset error byte code, and returning the response data to the upper computer.

Preferably, before the device processes the received data via the security chip, the method further includes that the device determines Whether the received data is the authenticating data or the register data, if yes, the device returns the result to the upper computer and turns off.

Figure 4:
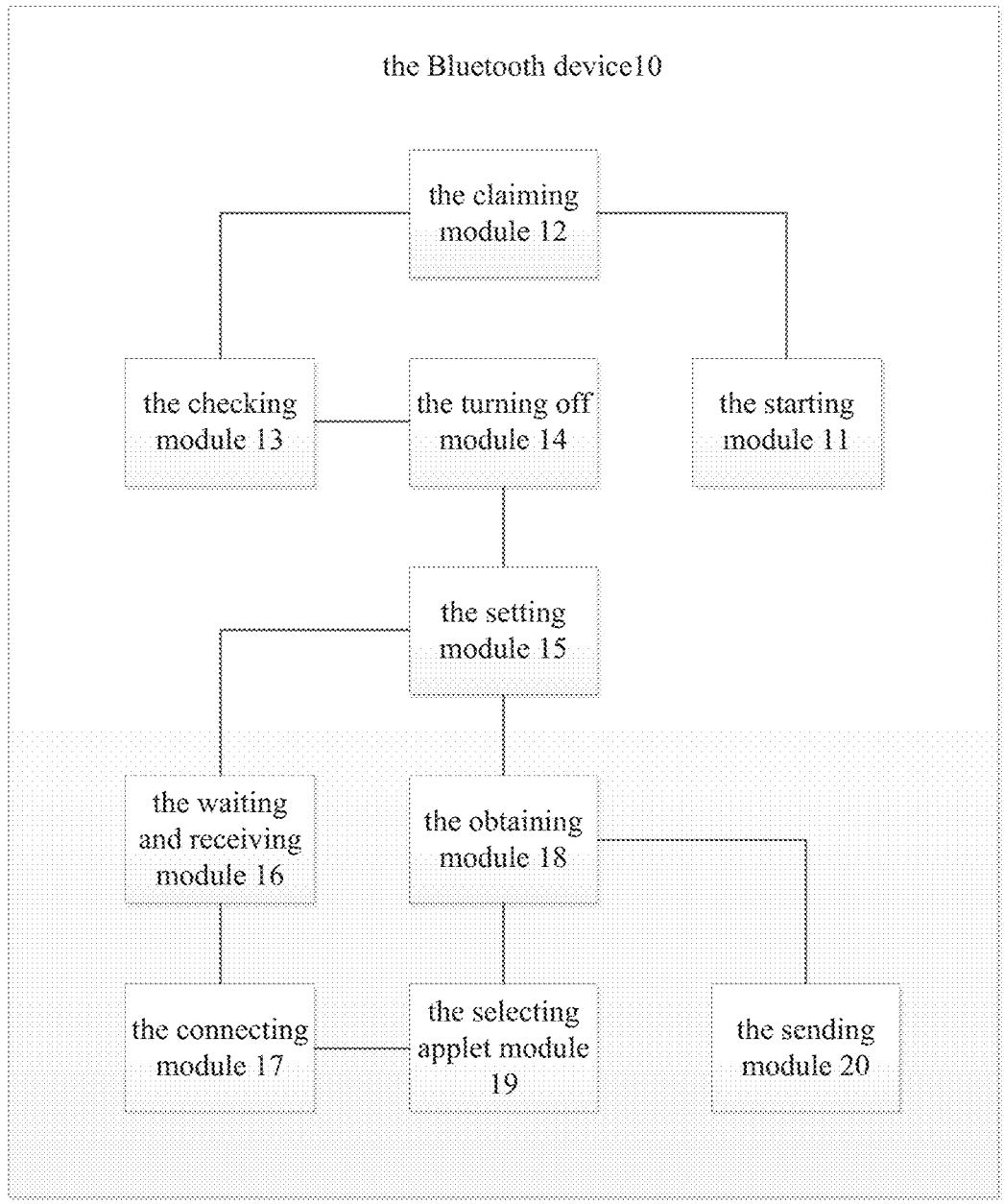
FIG. 4 is a diagrammatic drawing of a Bluetooth device according to Embodiment 3 of the present invention.

Embodiment 3:

According to Embodiment 3 of the present invention, it provides a Bluetooth device, as shown in FIG. 4, the device 10 includes a starting module 11, a claiming module 12, a checking module 13, a turning off module 14, a setting module 15, a waiting and receiving module 16, a connecting module 17, an obtaining module 18, a selecting applet module 19. and a sending module 20.

The starting module 11 is configured to start a first Bluetooth service and broadcast;

the starting module 11 is further configured to start a second Bluetooth service and broadcast;

the claiming module 12 is configured to claim that the Bluetooth device is a Bluetooth non-keyboard device;

the claiming module 12 is further configured to claim that the Bluetooth device is a Bluetooth keyboard device;

the checking module 13 is configured to check whether the key of the device is pressed;

the turning off module 14 is configured to turn off the first Bluetooth service when the checking module 13 checks that the key of the device is pressed;

the turning off module 14 is further configured to turn off the Bluetooth service;

the obtaining module 18 is configured to obtain a second MAC address;

the setting module 15 is configured to store a current MAC address as the first MAC address, and set the current MAC address as the second MAC address:

the obtaining module 18 is further configured to obtain the stored first MAC address;

the setting module 15 is further configured to set the MAC address of the device as the first MAC address, and start the first Bluetooth service and broadcast that the device is a Bluetooth non-keyboard device.

the waiting and receiving module 16 is configured to wait and receive a building connection instruction sent from the upper computer;

the receiving module 17 is configured to wait and build connection when the receiving module 16 receives the building connection instruction;

the selecting applet module 19 is configured to obtain an applet identification of a dynamic password applet after the connecting module 17 builds connection successfully;

the obtaining module 18 is further configured to obtain the dynamic password value via the dynamic password applet; and the sending module 20 is configured to send the dynamic password value obtained by the obtaining module 18 to the upper computer according to the Bluetooth keyboard protocol.

In Embodiment 3, the Bluetooth non-keyboard device specifically is the authenticating device.

After the claiming module 12 claims the Bluetooth device is the Bluetooth non-keyboard device, the device further includes the waiting and receiving module 16 is specifically configured to wait for receiving the building connection instruction sent from the upper computer;

the connecting module 17 is specifically configured to wait for building connection after the waiting and receiving module 16 receives the building connection instruction; and the selecting applet module 19 is further configured to select authenticating applet according to the applet identification.

In Embodiment 3, the selecting applet module 19 specifically includes a first obtaining unit, a first selecting unit, a second obtaining unit and a second selecting unit;

the first obtaining unit is configured to obtain the applet identification from the default setting, and to send the applet identification to the security chip in the device;

the first selecting unit is configured to select the authenticating applet according to the apple identification obtained by the first obtaining unit;

the second obtaining unit is configured to receive the selecting applet instruction sent from the upper computer, and send the selecting applet instruction to the security chip in the device, and the security chip obtains the authenticating applet identification according to the selecting applet instruction; and the second selecting unit is configured to select the authenticating applet according the authenticating apple identification obtained by the second obtaining unit.

In Embodiment 3, the waiting and receiving module 16 is further configured to receive data sent from the upper computer, and to process the received data via the security chip, and to return the result to the upper computer.

In Embodiment 3, the waiting and receiving module 16 includes a first determining unit;

the first determining unit is configured to determine a type of data sent from the upper computer;

when the first determining unit determines that the received data is the register request data, the waiting and receiving module 16 further includes that a first parsing unit, an encrypting unit, a first signing unit and a first consisting unit;

the first parsing unit is configured to parse the register request data to obtain the first data and the second data, and to generate the second key pair;

the first consisting unit is configured to consist the being-encrypted data according to the private key of the second key pair and the first data;

the encrypting unit is configured to encrypt the being-encrypted data consisted by the first consisting unit by using the stored symmetric key pair to obtain the key handle;

the first signing unit is configured to sign on the stored certificate template content by using the private key of the preset key pair to obtain the signature value;

the first consisting unit is further configured to consist the authenticating certificate according to the signature value and the certificate template content;

the first consisting unit is further configured to consist the first being-signed data according to the first data, the second data, the key handle and the public key of the second key pair;

the first signing unit is further configured to sign on the first being-signed data by using the private key of the stored first key pair to obtain the first signature result;

the first consisting unit is further configured to consist the response data of the register request data according to the second key pair, the key handle, the authenticating certificate and the first signature result, and return the response data to the upper computer;

when the first determining unit determines that the received data is the authenticating request data, the waiting and receiving module 16 further includes a second parsing unit, a decrypting unit, a second signing unit and a second consisting unit;

the second parsing unit is configured to parse the authenticating request data to obtain the first parameter, the second parameter and the key handle;

the decrypting unit is configured to decrypt the key handle by using the stored symmetric key to obtain the first decrypted. data and the second decrypted data;

the second consisting unit is configured to obtain the current number of times for authentication, and to consist the second being-signed data according to the first parameter, the second parameter and the number of times for authentication;

the second signing unit is configured to sign on the second being-signed data by using the second decrypted data to obtain the second signature result;

the second consisting unit is configured to consist the response data of the authenticating request data according to the number of times for authentication and the second signature result, and return the response data to the upper computer; and when the first determining unit determines that the received data is other data, the waiting and receiving module 16 further includes that an executing unit;

the executing unit is configured to execute other corresponding operation, and return corresponding response data to the upper computer.

In Embodiment 3, when the first determining unit determines that the received data is the authenticating request data, the waiting and receiving module 16 further includes a determining sub-unit;

the determining sub-unit is configured to determine whether the current user is legitimate according to the first parameter and the first decrypted data; and the second consisting unit is further configured to consist the response data of the authenticating request data according to the preset error byte code when the determining sub-unit determines that the current user is illegitimate, and to return the response data to the upper computer.

In Embodiment 3, the waiting and receiving module 16 is specifically configured to receive data sent from the upper computer, and before processing the received data via the security chip, the waiting and receiving module 16 further includes a second determining unit;

the second determining unit is configured to determine whether the received data is the authenticating data or register data; and when the second determining unit determines that the received data is the authenticating data or the register data, the waiting and receiving module 16 further includes a turning off unit;

the turning off unit is configured to return the processed result to the upper computer and turn off the device.

In Embodiment 3, the sending module 20 includes a shifting unit and a sending unit;

the shifting unit is configured to shift the dynamic password value obtained by the obtaining module 18 into Bluetooth keyboard class virtual key information according to the Bluetooth keyboard protocol; and the sending unit is configured to send automatically the virtual key information obtained by the shifting unit to the upper computer successively.

In Embodiment 3, the selecting applet module 19 includes a third obtaining unit and a third selecting unit;

the third obtaining unit is configured to receive the selecting applet instruction sent from the upper computer, and to send the selecting applet instruction to the security chip in the device, and the security chip obtains the applet identification according to the selecting applet instruction; and the third selecting unit is configured to select the dynamic password applet according to the applet identification obtained by the third obtaining unit.

In Embodiment 3, the checking module 13 is specifically configured to determine whether the key of the device is pressed via checking whether there is a triggering key signal in the checking chip IO port.

In Embodiment 3, when the obtaining module 18 is configured to obtain the second MAC address, the obtaining module 18 is specifically configured to obtain the current MAC address, add 1 to the last byte of the current MAC address to obtain the second MAC address.

According to the present invention, it provides a Bluetooth device which can realize different device types via setting a MAC address of the device or a broadcast device type; when the device is a Bluetooth keyboard device, it can realize a function of inputting a dynamic password, the device shifts the obtained dynamic password value into the Bluetooth keyboard class virtual key information according to the Bluetooth keyboard protocol, and sends automatically the virtual key information to the upper computer successively, the device can restore the device type automatically to resolve the conflict between the keyboard device and the upper computer about keyboard, through the present disclosure, the user can lower errors when inputting the dynamic password so as to improve security of the identity authentication.

The technical solution in the Embodiment of the present invention is further described more clearly and completely with the drawings of the present invention. Apparently, Embodiments described herein are just a few Embodiments of the present invention. On the basis of Embodiments of the invention, all other related Embodiments made by those skilled in the art without any inventive work belong to the scope of the invention.

The invention claimed is:

1. A working method for a Bluetooth device, wherein the method comprises the following steps:

S1) starting, by the device, a first Bluetooth service and broadcasting that the device is a Bluetooth non-keyboard device;

S2) turning off, by the device, the first Bluetooth service when the device checks a key of the device is pressed down, then executing Step S3;

S3) storing, by the device, a current MAC address as a first MAC address, obtaining a second MAC address, and setting the current MAC address as the second MAC address;

S4) starting, by the device, a second Bluetooth service and broadcasting that the device is a Bluetooth keyboard device, waiting for receiving a building connection instruction sent from an upper computer, and building a connection when the building connection instruction is received, if the connection is built successfully, obtaining an applet identification of a dynamic password applet, and selecting a dynamic password applet according to the applet identification;

S5) obtaining, by the device, a dynamic password value via a dynamic password applet, and sending the obtained dynamic password value to the upper computer according to the Bluetooth keyboard protocol; and S6) turning off, by the device, the second Bluetooth service, obtaining a first MAC address which is stored, and setting the MAC address of the device as the first MAC address, and starting the first Bluetooth service and broadcasting that the device is the Bluetooth non-keyboard device.

2. The method as claimed in claim 1, wherein the Bluetooth non-keyboard device specifically is an authenticating device;

before step S2, the method further comprises waiting, by the device, for receiving the building connection instruction sent from the upper computer, building the connection when the building connection instruction is received, and selecting an authenticating applet according to the applet identification if the connection is built successfully.

3. The method as claimed in claim 2, wherein, selecting the authenticating applet according to the authentication applet identification specifically is: obtaining, 1w the device, an applet identification in a default setting, sending the applet identification to a security chip in the device, and selecting, by the security chip, an authenticating applet according to the applet identification; or receiving, by the device, a selecting applet instruction sent from the upper computer, and sending the selecting applet instruction to the security chip in the device, and obtaining, by the security chip, the authenticating applet identification according to the selecting applet instruction, and selecting the authenticating applet according to the authenticating apple identification.

4. The method as claimed in claim 2, wherein, step S2 further comprises: receiving, by the device, data sent from the upper computer, processing the received data received via the security chip, and returning a processed result to the upper computer.

5. The method as claimed in claim 4, wherein receiving, by the device, data sent from the upper computer, and processing the data received via the security chip specifically is: determining, by the device, a type of the data sent from the upper computer;

executing step 101 if the received data is register request data; executing step 103 if the received data is authenticating request data; while executing step 106 if the received data is other data;

101) parsing, by the device, the register request data to obtain first data and second data, so as to generate a second key pair; forming being-encrypted data according to a private key of the second key pair and the first data, encrypting the being-encrypted data by using a stored symmetric key to obtain a key handle; signing on a stored certificate template content by using a private key of a preset key pair to obtain a signature value, forming an authenticating certificate according to the signature value and the certification template content; forming a first being-signed data according to the first data, the second data, the key handle and a public key of the second key pair, and signing on the first being-signed data by using the private key of the stored first key pair so as to obtain a first signature result;

102) forming, by the device, response data of the register request data according to the second key pair, the key handle, the authenticating certificate and the first signature result, then returning the response data to the upper computer;

103) parsing, by the device, the authenticating request data to obtain a first parameter, a second parameter and the key handle, and decrypting the key handle by using the stored symmetric key to obtain a first decrypted data and a second decrypted data;

104) obtaining, by the device, a current number of times for authentication, forming a second being-signed data according to the first parameter, the second parameter and the number of times for authentication, and signing on the second being-signed data by using the second decrypted data to obtain a second signature result;

105) forming, by the device, response data of the authenticating request according to the number of times for authentication and the second signature result, and returning the response data to the upper computer; and 106) executing, by the device, other corresponding operation, and returning corresponding response data to the upper computer.

6. The method as claimed in claim 5, wherein, before step 104, the method further includes: determining whether a current user is legitimate according to the first parameter and the first decrypted data, if yes, executing step 104; otherwise, forming the response data of the authenticating request data according to a preset error byte code, and returning the response data to the upper computer.

7. The method as claimed in claim 4, wherein before processing the data received via the security chip, the method further comprises: determining, by the device, whether the received data is authenticating data or register data, if the received data is the authenticating data or the register data, the device returning the processed result to the upper computer and turning off the device; otherwise, returning to step S2.

8. The method as claimed in claim 1, wherein sending the obtained dynamic password value to the upper computer according to the Bluetooth keyboard protocol specifically is: shifting, by device, the obtained dynamic password value into Bluetooth keyboard class virtual key information according to the Bluetooth keyboard protocol, and sending automatically the virtual key information to the upper computer successively.

9. The method as claimed in claim 1, wherein obtaining the applet identification of the dynamic password applet, and selecting the dynamic password applet according to the applet identification specifically is: receiving, by the device, the selecting applet instruction sent from the upper computer, sending the selecting applet instruction to the security chip in the device, obtaining, by the security chip, the applet identification according to the selecting applet instruction, and selecting the dynamic password applet according to the applet identification.

10. The method as claimed in claim 1, wherein obtaining the second MAC address specifically is: obtaining, by the device, the current MAC address, adding 1 to the last byte of the current MAC address to obtain the second MAC address.

11. A Bluetooth device, wherein said device comprises a starting module, a claiming module, a checking module, a turning off module, a setting module, a waiting and receiving module, a connecting module, an obtaining module, a selecting applet module, and a sending module;

the starting module which is configured to start a first Bluetooth service and broadcast;

the starting module which is further configured to start a second Bluetooth service and broadcast;

the claiming module which is configured to claim the Bluetooth device is a Bluetooth non-keyboard keyboard device;

the claiming module which is further configured to claim the Bluetooth device is a Bluetooth keyboard device;

the checking module which is configured to check whether any key of the device is pressed;
the turning off module which is configured to turn off the first Bluetooth service when the checking module checks a key is pressed down;
the turning off module is further configured to turn off the second Bluetooth service;
the obtaining module is configured to obtain a second MAC address;
the setting module is configured to store a current MAC address as a first MAC address, and set the current MAC address as the second MAC address;
the obtaining module is further configured to obtain the stored first MAC address;
the setting module is further configured to set a MAC address of the device as the first MAC address, and to start the first Bluetooth service and broadcast that the device is the Bluetooth non-keyboard device;
the waiting and receiving module is configured to wait for receiving a building connection instruction sent from the upper computer;
the connecting module is configured to build connection when the waiting and receiving module receives the building connection instruction;
the selecting applet module is configured to obtain the applet identification of the dynamic password applet after the connection module builds connection successfully, and to select the dynamic password applet according to the applet identification;
the obtaining module is further configured to obtain a dynamic password value via the dynamic password applet; and
the sending module is configured to send the dynamic password value obtained by the obtaining module to the upper computer according to the Bluetooth keyboard protocol.

12. The device as claimed in claim 11, wherein the Bluetooth non-keyboard device is specifically an authenticating device;
after the claiming module claims the Bluetooth device is the Bluetooth non-keyboard device, the device further includes:
the waiting and receiving module specifically configured to wait for receiving the building connection instruction sent from the upper computer;
the connecting module specifically configured to build connection when the waiting and receiving module receives the building connection instruction; and
the selecting apple module further configured to select an authenticating applet according to the applet identification.

13. The device as claimed in claim 12, wherein the selecting applet module specifically comprises a first obtaining unit, a first selecting unit, a second obtaining unit, and a second selecting unit;
the first obtaining unit is configured to obtain the applet identification in the default setting, and send the applet identification to the security chip in the device;
the first selecting unit is configured to select the authenticating applet according to the applet identification obtained by the first obtaining unit;
the second obtaining unit is configured to receive a selecting applet instruction sent from the upper computer, send the selecting applet instruction to the security chip in the device, and the security chip obtains the authenticating applet identification according to the selecting applet instruction; and
the second selecting unit is configured to select an authenticating applet according to the authenticating applet identification obtained by the second obtaining unit.

14. The device as claimed in claim 12, wherein the waiting and receiving module is further configured to receive data sent from the upper computer, process the data received via the security chip, and return the processed result to the upper computer.

15. The device as claimed in claim 14, wherein the waiting and receiving module comprises a first determining unit;
the first determining unit is configured to determine a type of the received data sent from the upper computer;
when the first determining unit determines that the received data is register request data, the waiting and receiving module further comprises a first parsing unit, an encrypting unit, a first signature unit, and a first forming unit;
the first parsing unit is configured to parse the register request data to obtain the first data and the second data, and generate the second key pair;
the first forming unit is configured to form being-encrypted data according to the private key of the second key pair and the first data;
the encrypting unit is configured to encrypt the being-encrypted data consisted of the first forming unit by using the stored symmetric key so as to obtain the key handle;
the first signing unit is configured to sign on the stored certificate template content by using the private key of a preset key pair to obtain a signature value;
the first forming unit is further configured to form an authenticating certificate according to the signature value and the certificate template content;
the first forming unit is further configured to form the first being-signed data according to the first data, the second data, the key handle and the public key of the second key pair;
the first signing unit is further configured to sign on the first being-signed data by using the private key of the first key pair to obtain a first signature result;
the first forming unit is further configured to form response data of the register request data according to the second key pair, the key handle, the authenticating certificate and the first signature result, and return the response data to the upper computer;
when the first determining unit determines that the received data is the authenticating request data, the waiting and receiving module further comprises a second parsing unit, a decrypting unit, a second signing unit, and a second forming unit;
the second parsing unit is configured to parse the authenticating request data to obtain a first parameter, a second parameter and a key handle;
the decrypting unit is configured to decrypt the key handle by using the stored symmetric key to obtain first decrypted data and second decrypted data;
the second forming unit is configured to obtain a current number of times for authentication, and form a second being-signed data according to the first parameter, the second parameter and the number of times for authentication;
the second signing unit is configured to sign on the second being-signed data by using the second decrypted data to obtain a second signature result;
the second forming unit is configured to form response data of the authenticating request data according to the number of times for authentication and the second signature result, and return the response data to the upper computer; and when the first determining unit determines that the received data is other data, the waiting and receiving module further comprises an executing unit;

the executing unit is configured to execute other corresponding operations, and return corresponding response data to the upper computer.

16. The device as claimed in claim 15, wherein when the first determining unit determines the received data is the authenticating request data, the waiting and receiving module further comprises a determining sub-unit;

the determining sub-unit is configured to determine whether a current user is legitimate according to the first parameter and the first decrypted data; and the second forming unit is further configured to form response data of the authenticating request data according to a preset error byte code when the determining sub-unit determines that the current user is illegitimate, and return the response data to the upper computer.

17. The device as claimed in claim 14, wherein the waiting and receiving module is specifically configured to receive the data sent from the upper computer, before processing the data received via the security chip, the waiting and receiving module further includes a second determining unit;

the second determining unit is configured to determine whether the received data is the authenticating data or the register data; and when the second determining unit determines that the received data is the authenticating data or the register data, the waiting and receiving module further includes a turning off unit;

the turning off unit is configured to return the processed result to the upper computer and turn off the device.

18. The device as claimed in claim 11, wherein the sending module comprises a shifting unit and a sending unit;

the shifting unit is configured to shift the dynamic password value obtained by the obtaining module into Bluetooth keyboard class virtual key information according to the Bluetooth keyboard protocol; and the sending unit is configured to send automatically the virtual key information obtained by the shifting unit to the upper computer successively.

19. The device as claimed in claim 11, wherein the selecting applet module comprises a third obtaining unit and a third selecting unit;

the third obtaining unit is configured to receive the selecting applet instruction sent from the upper computer, and send the selecting applet instruction to the security chip in the device, and the security chip obtains the applet identification according to the selecting applet; and the third selecting unit is configured to select the dynamic password applet according to the applet identification obtained by the third obtaining unit.

20. The device as claimed in claim 11, wherein when the obtaining module is configured to obtain the second MAC address, the obtaining module is specifically configured to obtain the current MAC address, and add 1 to the last byte of the current MAC address so as to obtain the second MAC address.

* * * * *